United States Patent [19]

Ohno et al.

[11] 3,911,448

[45] Oct. 7, 1975

[54] PLURAL LIQUID RECORDING ELEMENTS

[75] Inventors: Genji Ohno, Yokohama; Tadamitsu Uchiyama, Tokyo; Seisaku Ohki, Tokyo; Hishao Morohashi, Tokyo, all of Japan

[73] Assignee: Research & Development Laboratories of Ohno Company Limited, Japan

[22] Filed: Nov. 20, 1973

[21] Appl. No.: 417,543

[30] Foreign Application Priority Data

Nov. 22, 1972 Japan............................. 47-117459
Nov. 22, 1972 Japan............................. 47-117460
Nov. 24, 1972 Japan............................. 47-117736

[52] U.S. Cl................. 346/140; 178/6.6 R; 346/75
[51] Int. Cl.²....................................... G01D 15/18
[58] Field of Search............. 346/75, 140; 178/6.6 R

[56] References Cited
UNITED STATES PATENTS

| 587,336 | 8/1897 | Short................................. 178/96 X |
| 2,556,550 | 6/1951 | Murray............................... 101/426 |
| 3,060,429 | 10/1962 | Winston................................ 346/1 |
| 3,270,637 | 9/1966 | Clark..................................... 95/1 |
| 3,480,962 | 11/1969 | Weigl et al............................... 346/1 |
| 3,484,793 | 12/1969 | Weigl..................................... 346/75 |
| 3,560,641 | 2/1971 | Taylor et al. ......................... 178/6.6 |

*Primary Examiner*—Joseph W. Hartary
*Attorney, Agent, or Firm*—Staas & Halsey

[57] ABSTRACT

A recording apparatus in which a plurality of recording elements supplied with a liquid imaging material and having ends for dispensing such material are disposed in side-byside, spaced relationship transversely of a recording member positioned in underlying relationship with the dispensing ends of the recording elements and continuously advanced by suitable means relative to the elements together with electrically operated control means responsive to an image to be reproduced for controlling the dispensing of the imaging material from the elements so as to selectively dispense the imaging material from the elements and apply an assembly of rows of intermittent, linear marks to said recording member with said marks arranged in transversely spaced, parallel relationship corresponding to the spacing of said elements to form a reproduction of said image on said recording member.

15 Claims, 18 Drawing Figures

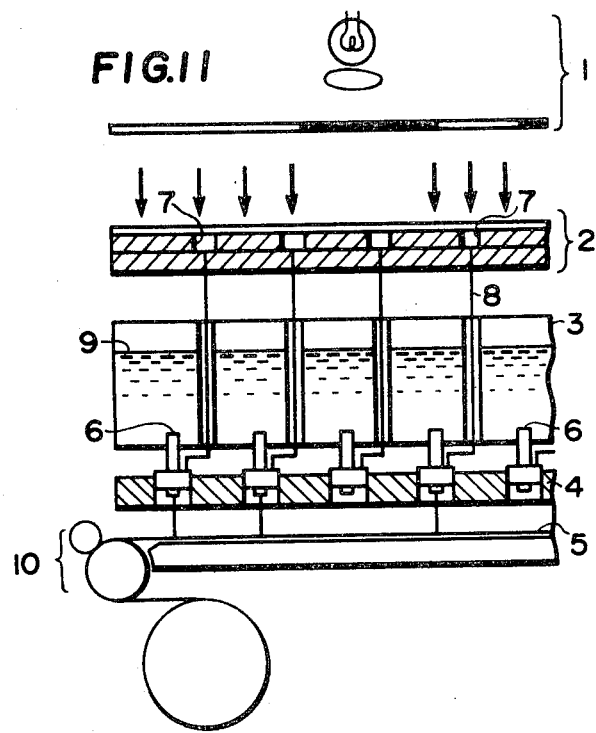
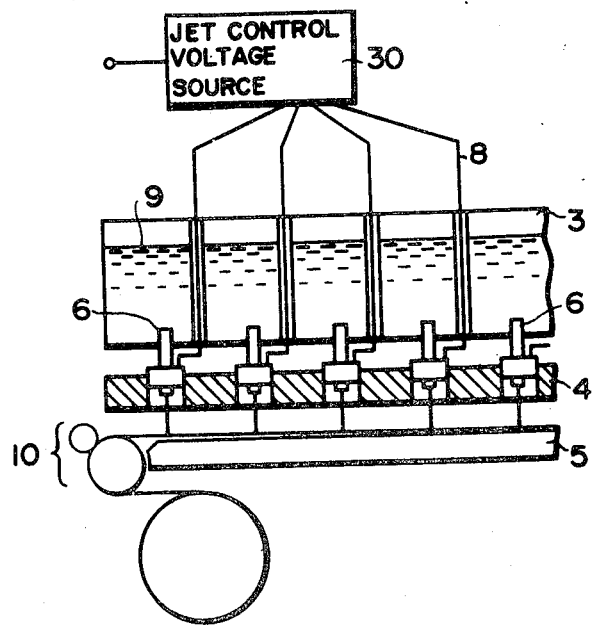

PLURAL LIQUID RECORDING ELEMENTS

BACKGROUND OF THE INVENTION

1. Field of the Invention

This invention relates to recording apparatus of the type that a picture is reproduced on a recording member or medium through the use of water or other liquid imaging material. More particularly, the invention relates to recording apparatus in which a picture corresponding to an original one or its memory is reproduced in the form of an assembly of dotted or linear picture elements on an ordinary recording member or medium such as paper, cloth, synthetic resin film, metal plate or the like.

2. Description of the Prior Art

Hitherto, the so-called printing using a printing plate has been employed for reproducing a picture on a recording member or medium such as paper, cloth, film, metal plate or the like. Further, conventional copying methods of the type repeatedly using the same plate are (1) an electrostatic powder transfer method which transfers a color-powdered image on a photoconductive plate onto a recording member, (2) an electrostatic transfer method which transfers an electrostatic latent image onto a recording member and then develop it with a dry or liquid toner, and (3) the so-called facsimile methods which reproduces a picture by sequential scanning of a recording member with a single recording element for the same picture. However, these prior art methods require complicated plates made for printing, so that they are unsuitable for making a small number of copies and are not always fit for use with recording members having uneven surfaces.

The electrostatic powder transfer method utilizes the electrostatic latent image on the photoconductive plate, and hence is susceptible to the influence of temperature of the air and, further, this method requires four or five processes, and hence is complicated. The development with the dry toner has disadvantages such as dispersion or scattering of the powder used. The liquid development method has disadvantages such as poison of a solvent used, danger of fire and so on. Further, since the facsimile method employs a single recording element, it is defective in that picture reproduction requires a long period of time.

SUMMARY OF THE INVENTION

This invention is to provide novel recording apparatus which is free from the aforementioned defects, simple in process, insusceptible to the influence of humidity, free from danger of poison and fire, and capable of high-speed recording.

The recording apparatus of this invention comprises a drawing unit composed of a liquid imaging material storage and supply tank, a plurality of recording elements supplied with the liquid imaging material from the tank and a unit for driving, relative to the drawing unit, a recording member or medium placed in opposing relation to the drawing unit. The recording elements are disposed in such a manner that images formed thereby on the recording member may be divided into uniform intervals in the direction of travel of the recording member and the recording elements are controlled through the liquid imaging material storage and supply tank.

The control of the recording elements of the drawing unit is achieved by means of a control unit which comprises an optical image irradiating unit and a plurality of photo switching elements which are irradiated by an optical image to be electrically turned on and off corresponding to the optical image. The photo switching elements of the control unit are electrically connected with the recording elements through the aforesaid storage and supply tank, whereby recording can be controlled optically. Further, it is also possible to apply an electric signal directly to a signal input terminal of each recording element based on a memory recorded, for example, on a magnetic tape or the like.

The recording elements of the drawing unit each have a hollow, very small nozzle which is supplied with the liquid imaging material from the storage and supply tank. An electrode plate, which has formed therein a through hole coaxial with the nozzle, is disposed in opposing relation to the tip of the nozzle. A ring, which is connected with a signal input terminal, is disposed coaxial with the nozzle in the vicinity of the open end portion of the nozzle or between the nozzle and the electrode plate. A convergent or unfluctuated jet of the liquid imaging material, which is produced by applying a voltage between the nozzle and the electrode plate, is directed through the hole of the electrode plate to a recording member or medium disposed adjacent to the electrode plate on the opposite side from the nozzle. A voltage is applied to the signal input terminal connected to the ring through the storage and supply tank, whereby an image formed by the jet is intermittently recorded.

BRIEF DESCRIPTION OF THE DRAWINGS

This invention will be more fully understood by the following description and the attached drawings, in which:

FIGS. 11 and 12 are cross-sectional views, for explaining the construction of examples of this invention;

DESCRIPTION OF THE PREFERRED EMBODIMENTS

Figure 1:
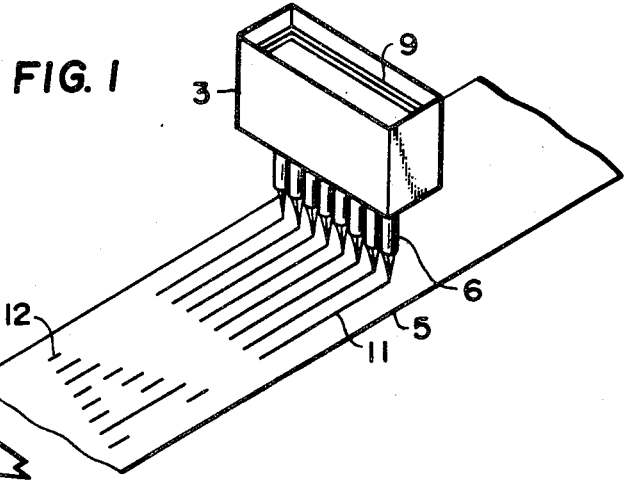
FIG. 1 is a perspective view, for explaining the general features of this invention.

Referring first to FIG. 1, the principles of this invention will hereinbelow be described. As shown in the figure, a plurality of recording elements 6, each of which is supplied with a liquid imaging material 9 from a storage and supply tank 3 and intermittently records a linear or a continuous, dot-like image on a travelling recording member or medium 5 in response to a signal, are disposed in such a manner that the images formed thereby may be closely divided into uniform intervals on the surface of the recording member 5 in its travelling direction. With such an arrangement, uniform, continuous, dotted lines 11 are obtained and, by appropriate intermittent drawing of the lines 11 by the recording elements, a character or figure forming an image with linear picture elements 12 can be drawn.

Within the teachings of this invention, the recording element 6 may be a contactless recording element utilizing an ink jet through the use of a hollow, small nozzle, or a contact recording type recording element such as a ball pen or a glass pen. The recording element suitable for use in this invention is an ink jet recording element, which comprises a hollow, small nozzle supplied with the liquid imaging material, an electrode plate having formed therein a through hole coaxial with the nozzle and disposed opposite to the tip of the nozzle, and a ring of small diameter disposed coaxially with the nozzle in the neighborhood of its open end portion or between the nozzle and the electrode; the element produces a convergent jet of the liquid imaging material, by the impression of a voltage between the nozzle and the electrode plate, to be directed through the through hole of the electrode plate onto the surface of the recording member disposed adjacent to the electrode plate on the opposite side from the nozzle. The convergent jet is made intermittent by applying a voltage to the ring of small diameter. The construction of the recording element described above will hereinbelow be described in detail.

Figure 2:
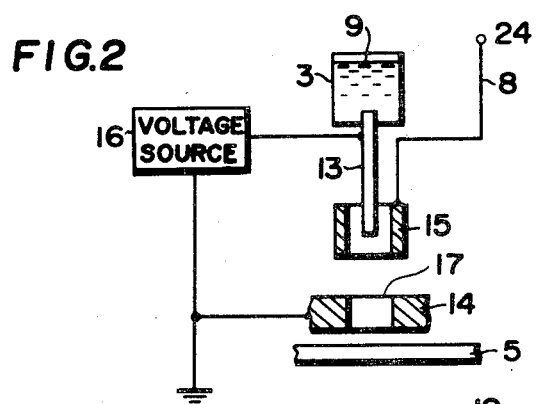
FIG. 2 is an explanatory diagram showing the construction of a recording element for use in this invention.

In FIG. 2, a hollow, small nozzle 13, which has an inner diameter of 0.25 mm and is formed of stainless steel, is supplied with the liquid imaging material 9 composed of the following materials from the liquid imaging material storage and supply tank 3:

| | |
|---|---|
| cyanine blue | 0.5 parts |
| methanol | 10 parts |
| glycerine | 5 parts |
| water | 85 parts |

An electrode plate 14 having a through hole 17 coaxial with the nozzle 13 is disposed opposite to the tip of the nozzle 13 and the electrode plate 14 and the nozzle 13 are both connected to a high-tension voltage source 16.

A metal ring 15 of small diameter is disposed coaxial with the nozzle 13 at its tip or between the nozzle 13 and the electrode plate 14 placed adjacent thereto.

Upon supply of a voltage between the nozzle 13 and the electrode plate 14 from the high-tension voltage source 16, the liquid imaging material begins to drip from the tip of the nozzle 13 at 1.8 KV and a fine convergent jet of the imaging material 9 is produced at 2.1 KV. This jet is a continuous jet of droplets having a diameter of about 0.1 mm on the average and the number of droplets per second is dependent upon the characteristics of the voltage source 16 and the configuration of the tip of the nozzle but in the range of about 500 to 2000.

The jet of the liquid imaging material 9 passes through the through hole 17 of the electrode plate 14 and reaches the recording member 5 placed on the opposite side from the nozzle 13 and travelling relative thereto, thus recording a linear or continuous, dotted line on the surface of the recording member 5. At this time, if a voltage 300V of the same polarity as that applied to the nozzle 13 is applied to a terminal 24 connected to the ring 15 through a lead 8, the electric field established at the tip of the nozzle 13 is lowered in spite of the voltage being applied between the nozzle 13 and the electrode plate 14, so that the jet of the liquid imaging material 9 is stopped. Upon removal of the voltage applied to the ring 15, the jet is produced again. In this manner, intermittent jetting of the liquid imaging material can be achieved electrically.

Figure 3:
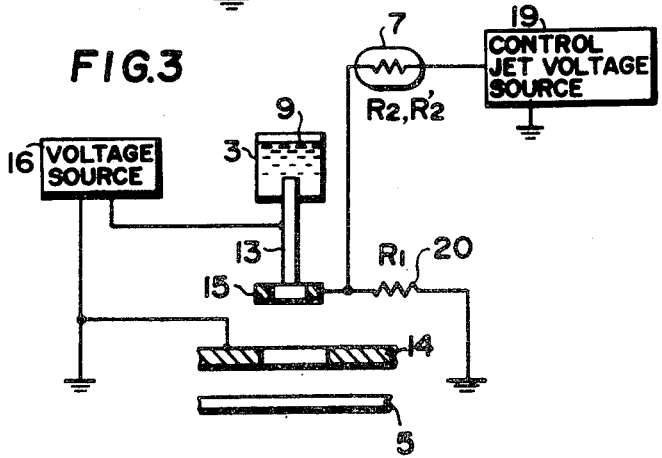
FIGS. 3 and 4 are diagrams, for explaining a system for controlling the recording element of FIG. 2.

In such a recording element, where light is used as a primary signal for the intermittent generation of the jet, the ring 15 of small diameter for intermittent jetting is grounded, for example, through a resistor 20 and, also connected to a control jet voltage source 19 through a photoconductive, photo switching element 7, as illustrated in FIG. 3. If the resistance of the photoconductive, photo switching element 7 when not irradiated by light is taken as $R_2$, if the resistance of the element 7 when irradiated by light is taken as $R_2'$ and if the resistance value of the grounding resistor 20 is taken as $R_1$, when $R_2' < R_1 < R_2$, the jet is stopped at the time of light irradiataion. In our experiments, When $R_1 = 10^7 \Omega$, $R_2 = 10^8 \Omega$ and $R_2' = 10^6 \Omega$, intermittent generation of the jet was very well controlled.

Figure 4:
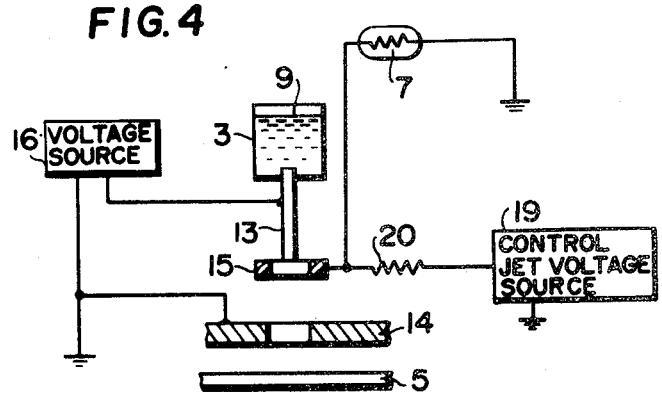

Further, by grounding the ring 15 through the photoconductive, photo switching element 7 and connecting the ring 15 to the jet intermitting power source 19 through the resistor 20 as depicted in FIG. 4, the jet can be produced during irradiation by light. When such an electrostatic ink jet is emitted by the hollow, minute nozzle, where light is used as the primary signal, the relationship between non-irradiation and irradiation of the photo switching element 7 and the intermittent generation of the jet can be reversed from positive/positive to positive/negative merely by changing the connection of the ring 15. In the case of the electrical ink jet with the hollow, minute nozzle, it is also possible that an electric signal is applied directly as the jet intermitting signal to a signal input terminal of a memory such as a magnetic tape or the like.

The ring 15 for intermittent generation of the jet in the foregoing may be positioned in the space between the tip of the nozzle 13 and the electrode plate 14, but where it is disposed in the neighborhood of the tip of the nozzle 13, the ring 15 is not stained with jet droplets scattered by impurities or the like.

The voltage applied to the ring 15 is required to be selected such that the electric field at the tip of the nozzle 13 may be lower than the voltage at which the droplets of the liquid imaging material 9 start dropping and this voltage can be made lower than 200V by appropriate selection of the inner diameter and position of the ring 15. The upper limit of the applied voltage may be higher than a voltage for generating the jet of the liquid imaging material. With the reduced inner diameter of the ring 15, the voltage for stopping the jet becomes lower correspondingly, but an inner diameter of less than 1.0 mm is likely to cause a discharge between the ring 15 and the nozzle 13 and too large an inner diameter causes a rapid increase in the stopping voltage. An optimum inner diameter is in the range of 1.0 to 10mm.

An increase in the distance between the ring 15 and the tip of the nozzle 13 causes an increase in the jet stopping voltage, and where the distance therebetween is in excess of 5 mm, the stopping voltage rapidly increases and the jet cannot be stopped even with a voltage equal to the jetting voltage.

The liquid imaging material 9 for use in the abovedescribed electrostatic ink jet is described to be mainly composed of water as given in the foregoing composition, but it may be selected from various liquid imaging materials which have a surface tension of 30 to 80 dynes/cm, a viscosity of less than 200 cps and an electric resistance of higher than $10^{-3}\Omega cm$.

With a surface tension of less than 30 dynes/cm, the liquid imaging material greatly blots on a fibrous recording member and, in addition, the number of droplets per minute is small and the weight of each droplet increases. With a surface tension exceeding 80 dynes/cm, wetting of the nozzle 13 is poor, which introduces a problem in the generation of the convergent jet.

Where the viscosity of the liquid imaging material is in excess of 200cps, the control of intermittent jetting becomes poor. Further, an electric resistance lower than $10^{-3}\Omega cm$ makes it difficult to generate the jet, and hence is not favorable.

Figure 5:
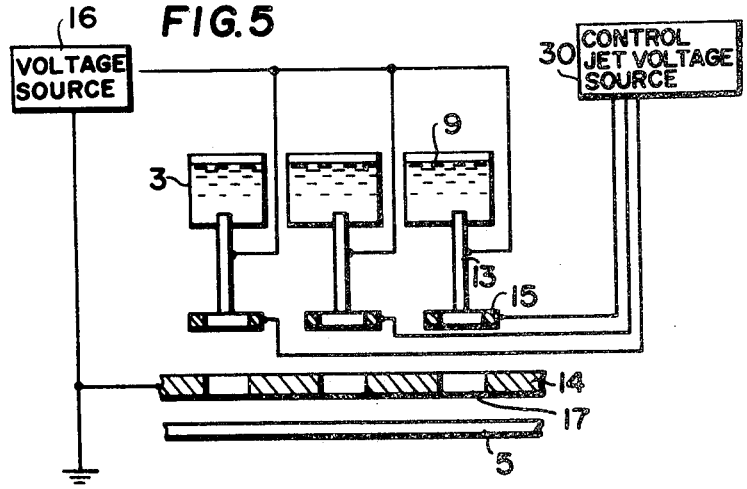
FIG. 5 is a diagram, for explaining the problems in the assembling of a plurality of non-shielded recording elements for use in this invention.

With such a construction as shown in FIG. 5 in which a plurality of pairs of nozzles 13 and rings, each of the latter being attached to the open end portion of each nozzle coaxially therewith, or disposed between the nozzle and each electrode plate placed opposite thereto, are disposed close to each other. The nozzle and the ring of each recording element are spaced only about several millimeters apart from those of adjacent recording elements; although it is preferred to space them as close as possible for providing enhanced resolution of a picture ultimately recorded on the recording medium. Consequently, there is the possibility that intermittent jetting from the nozzle 13 of each recording element becomes unstable under the influence of the jetting electric field of the nozzle and the control electric field of the ring of adjacent recording elements. Especially when the jet is exposed to the influence of the control electric field of adjacent rings, the directivity of the jet is extremely impaired, making it difficult to direct correctly to the center of the through hole 17 of the electrode plate 14.

To avoid these influences, it is necessary to shield at least one of the nozzle 13 and the ring 15 of each recording element from those of adjacent recording elements.

Figure 6:
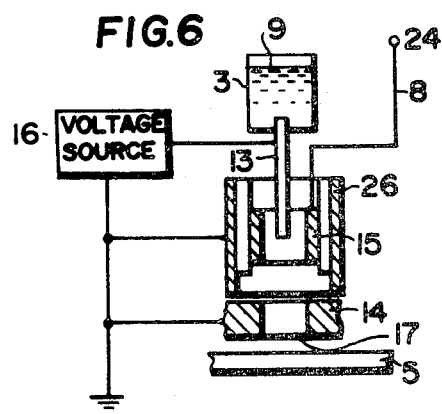
FIG. 6 is an explanatory diagram illustrating the construction of an example of a shielded recording element for use in this invention.

FIG. 6 illustrates an example of a shielded recording element for use in this invention. The shape of the ring 15 and its arrangement relative to the nozzle 13 are the same as those described with regard to FIG. 2. On the outside of the ring 15, a shield ring 26 made of a metal is disposed concentrically with the ring 15, as shown. In the event that a plurality of recording elements, each shielded as described above, are disposed as in FIG. 5, the influence of the control electric field of each ring 15 on the electric field between the nozzle 13 and the electrode plate 14 of adjacent recording elements is substantially attenuated by the shield ring 26. As a result of this, the intermittent generation of the convergent jet from the nozzle of each recording element correctly follows the control electric field of its own ring, thus eliminating the possibilities of inaccurate intermittent jetting and the disorder of the directivity of the jet.

Figure 7:
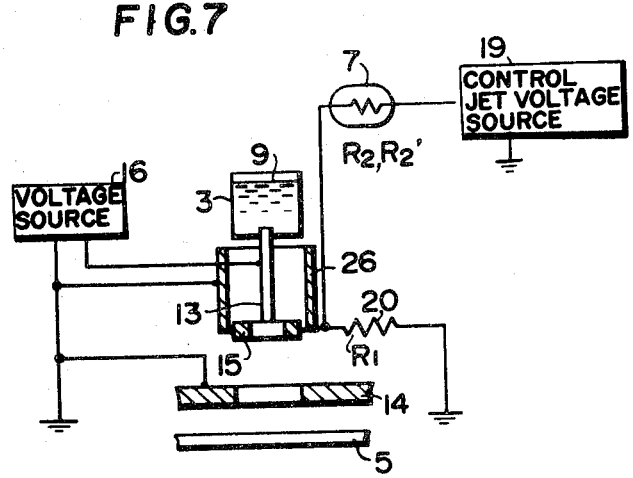
FIG. 7 is an explanatory diagram showing another example of a shielded recording element for use in this invention.

FIG. 7 shows another example of the shielded recording element for use in this invention. Namely, the ring 15 is disposed coaxially with the nozzle 13 in such a manner that the upper end of the ring 15 may lie less than 5 mm apart from the tip of the nozzle 13. The shield ring 26 having an inner diameter a little larger than the outer diameter of the ring 15 is disposed coaxial with the nozzle 13 and the shield ring 26 is long enough to shield the nozzle 13 and the ring 15. The control system for this example is the same as that described previously in connection with FIG. 3. Namely, the ring 15 for intermittent jetting is grounded through the resistor 20 and, also, connected to the control jet voltage source 19 through the photoconductive, photo switching element 7, whereby recording is controlled by light. As described previously, in our experiments, when $R_1 = 10^7\Omega$, $R_2 = 10^8\Omega$ and $R_2' = 10^6\Omega$, intermittent jetting was very well controlled, and no change in the directivity of the jet was observed.

Figure 8:
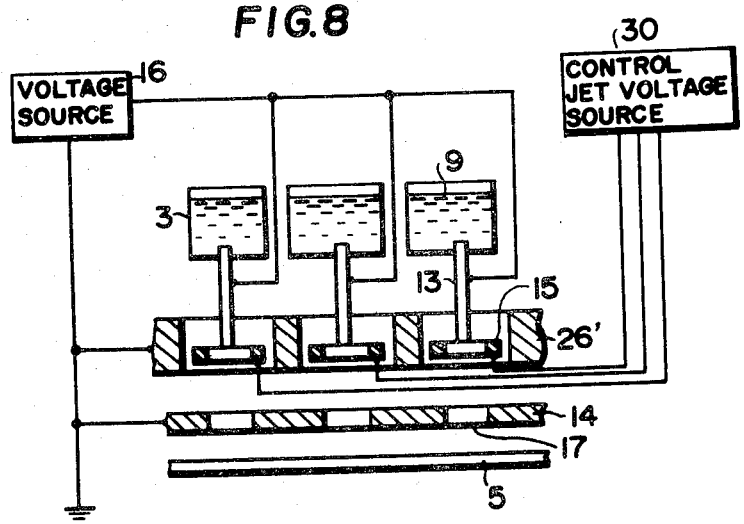
FIG. 8 is an explanatory diagram showing an example of the assembling of a plurality of shielded recording elements for use in this invention.

The shield ring 26 may be replaced with such a member 26 as shown in FIG. 8 which has through holes for shielding at least either one of the nozzle 13 and the ring 15 of each recording element from those of adjacent recording elements. The same results as mentioned above can be obtained with such a shielding member 26'.

As has been described in the foregoing, the influence of the control electric fields of adjacent recording elements can be eliminated by shielding at least one of the nozzle and the ring of each of a plurality of recording elements arranged close to each other from those of adjacent recording elements.

Further, where a plurality of non-shielded recording elements are arranged, the fixed electric field established between the nozzle and the electrode plate of each the outermost recording elements on both sides of the arrangement is exposed to the influence of the adjacent electric field only on one side of the recording element and the convergent jet is deflected thereby, but this phenomenon can be avoided by the application of the present invention.

The recording element for use in this invention is not limited specifically to the aforementioned one, but may be a recording element which makes direct contact with the recording member or medium, such as a ball pen, a glass pen or the like. In such a case, the recording element is intermittently brought into contact with the recording medium by mechanical or other means. For example, in FIG. 9, a recording element 6 employs a ball which is slidably mounted at the bottom of the liquid imaging material storage and supply tank 3 and the recording element 6 is supplied with the liquid imaging material 9 from a supply port 23 of the tank 3. The recording element 6 has attached thereto a rod-like connector 8 passing through the storage and supply tank 3. The free end portion of the connector 8 has mounted thereon a solenoid 21 for moving up and down the recording element 6, and a spring 22 for flexibly disposing the connector 8 from the medium 5. Where light is used as the primary signal for intermittent jetting, a coil of the solenoid 21 is connected to the control jet voltage source 19 through the photo switching element 7.

When the photoswitching element 7 is irradiated variously by an optical image, the element 7 is selectively disconnected and connected to the voltage source 19 to actuate the solenoid 21 to move the connector 8 up and down, respectively, by which the recording element 6 at the tip of the connector 8 intermittently records an image on the recording medium 5 corresponding to the optical image.

Figure 10:
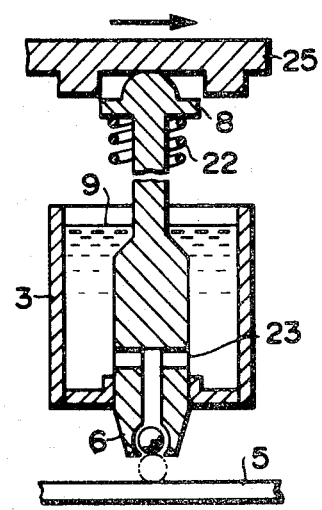

In such a contact type recording element as depicted in FIG. 10, a plate 25 having an uneven pattern such, for example, as an image formed by photoresist techniques, is moved in a direction of the arrow while being urged against the upper end of the connector 8, whereby the connector 8 is moved up and down, thus intermittently recording an image corresponding to the uneven pattern.

Figure 9:
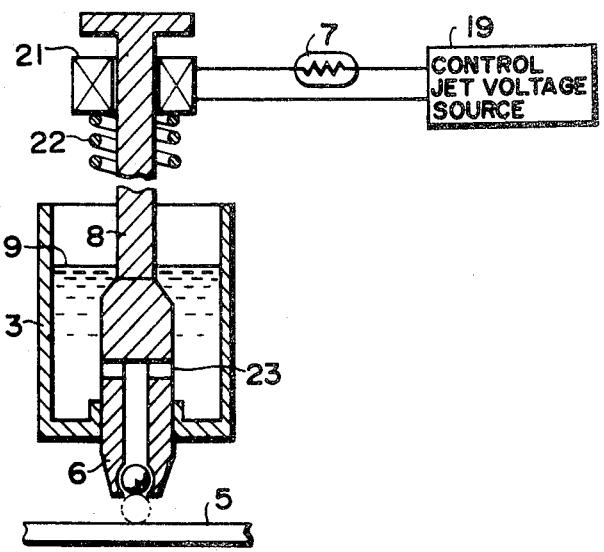
FIGS. 9 and 10 are explanatory diagrams illustrating other examples of the recording element.

Further, in FIG. 9, even by applying an electric signal directly to the solenoid 21 in a known manner without employing the photo switching element 7, a picture corresponding to the signal can be drawn.

The recording element for use in this invention may be any other type of recording element, so long as it intermittently records an image in response to a signal applied thereto.

Figure 13:
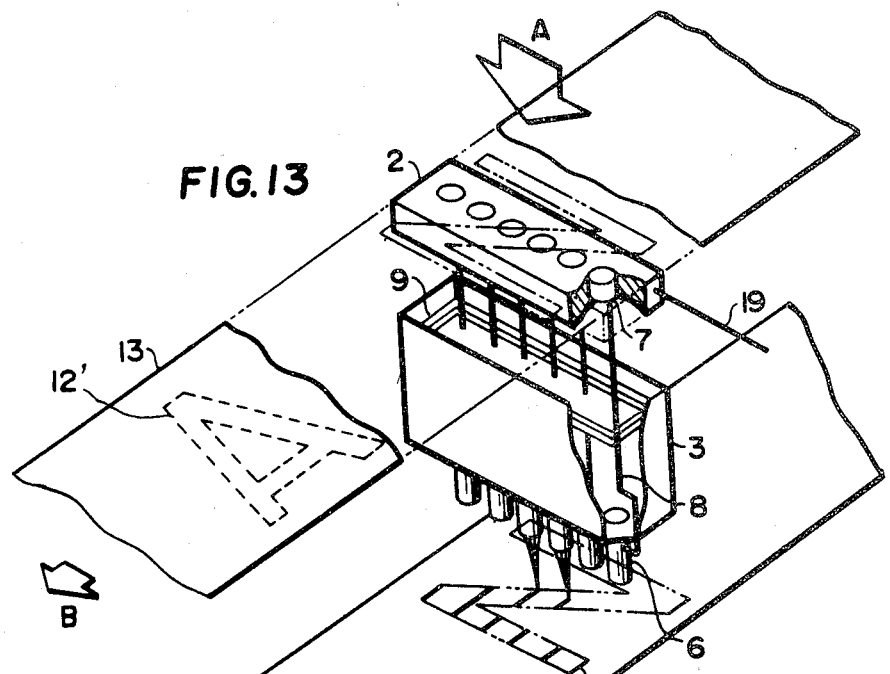
FIGS. 13 and 14 are schematic diagrams, for explaining functions of examples of this invention.

As shown in FIGS. 11, 13 and 12, a drawing unit 4 comprises a plurality of recording elements 6, which intermittently record linear or continuous, dotted lines on the recording medium travelling relative to the recording elements as described previously, are disposed in such a manner that the lines may be closely divided into uniform intervals on the recording medium 5 in its travelling direction. Further, a unit 10 is provided for disposing the recording member 5 to face towards the drawing unit 4 and moving it relative to the latter.

Each of the recording elements 6 is supplied with the liquid imaging material 9 from the storage and supply tank 3 and is connected with the control jet voltage source 30 through connector 8 passing through the storage and supply tank 3 as depicted, for example, in FIG. 12. Where light is used as the primary signal as in FIG. 11, an optical image irradiating unit 1 is disposed so that an optical image is projected on the light receiving face of a control unit 2 comprising a plurality of photo switching elements 7, which are electrically turned on and off by irradiation of light. The photo switching elements 7 each connect a signal source (not shown) and the recording elements 6 in a bit-by-bit manner by the connectors 8 passing through the storage and supply tank 3.

With such an arrangement, those photo switching elements 7 of the control unit 2 which have been exposed to irradiation of the optical image by the optical image irradiating unit 1 turn on and off the circuit of the power source such as shown in FIG. 9 at 19 to transmit signals corresponding to the optical image to the recording elements 6 through the connectors 8 to intermittently record the images, whereby a pattern corresponding to the optical image is recorded in the form of an assembly of linear or continuous, dotted-line picture elements on the surface of the recording member 5 driven by the drive unit 10. The shape and position of the pattern is dependent upon the intermittent drawing of the picture elements by the recording elements 6, that is, the timing of the turning on and off of the power source 19 by the photo switching elements 7 and the travelling speed of the recording member 5 relative to the recording elements 6. Accordingly, by selecting the optical image according to the travelling speed of the recording member 5 so that the photo switching elements 7 may be irradiated by light at such timing as forming a desired picture, the desired picture is recorded in the form of an assembly of linear, or continuous, dotted line picture elements on the recording member 5 by one process simultaneously with irradiation of the photo switching elements by the optical image.

In FIG. 13, an original 13 travelling on the light receiving surface of the control unit 2 intermittently intercepts a light (indicated by an arrow A) in accordance with character 12', thereby to control the timing of irradiation of the photo switching elements 7 by light. Where the arrangement of the recording elements 6 and that of the photo switching elements 7 are made identical with each other and the original 13 and the recording member 5 are driven at the same speed and in the same direction, a picture of the same size as the original figure is obtained on the recording member 5. Where the arrangement of the photo switching elements 7 is similar to that of the recording elements 6 but reduced as compared with the latter and the travelling speed of the original 13 is reduced corresponding to the reduction of the arrangement of the photo switching elements, an enlarged picture can be obtained. Where the arrangement of the photo switching elements 7 is similar to that of the recording elements 6 but enlarged as compared with the latter and the travelling speed of the original 13 is increased corresponding to the enlargement of the arrangement of the photo switching elements, a reduced picture can be obtained. Further, where the travelling speed of the original is the same as that of the photo switching elements, if only the reduction ratio or the enlargement ratio of the arrangement of the photo switching elements is altered, a picture can be enlarged or reduced only in one direction. Moreover, by connecting the photo switching elements 7 and the recording elements 6 to each other in opposite fashion and by driving the original and the recording member 5 in opposite directions, an inverted picture can be obtained.

Figure 14:
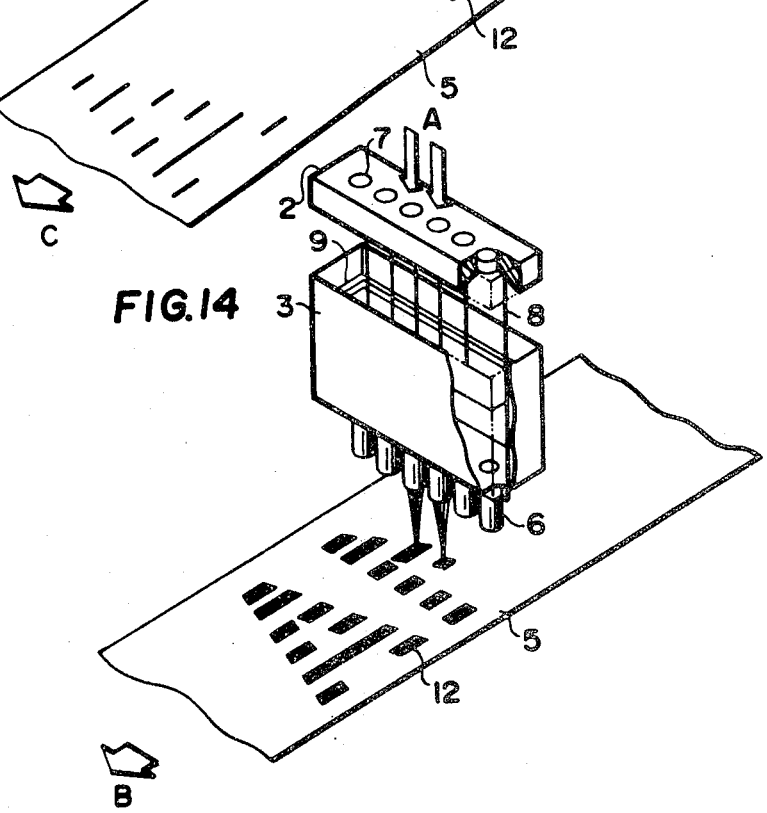

In the present invention, the optical image irradiating unit for use in the case of employing light as the primary signal irradiates the photo switching elements 7 of the control unit 2 by rays of light arranged in terms of time in accordance with the travelling speed of the recording member 5, as described above with regard to FIG. 13. Accordingly, it is also possible to employ such an optical image irradiating unit as shown in FIG. 14 which does not employ the original but directly irradiates the photo switching elements 7 by light by a known method such, for example, as a combination of the photo switching elements with a cathode ray tube which emits light based on a memory of the original recorded on a magnetic tape or the like (not shown). Further, in the present invention, the connections of the aforesaid various signal sources for intermittent drawing of images by the recording elements 6, with the recording elements 6 may also be made by connecting them directly to the connectors 8 passing through the liquid imaging material storage and supply tank 3. By connecting them through known signal transmitting means such as a telecommunication circuit or the like, long-distance transmission of a picture can be achieved within a very short period of time.

Figure 15:
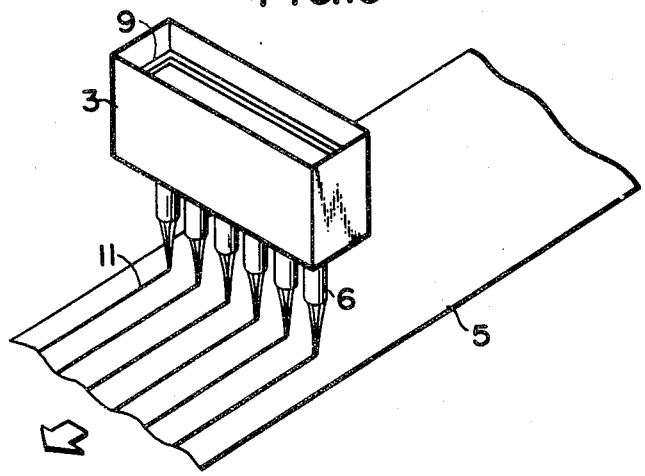
FIGS. 15 and 16 are perspective views, for explaining the arrangement of the recording elements.
Figure 16:
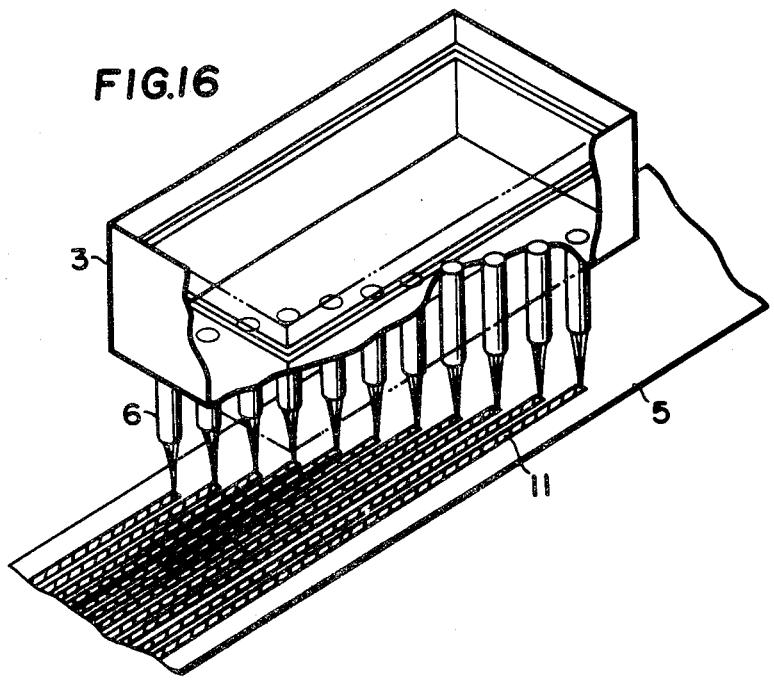
Figure 17:
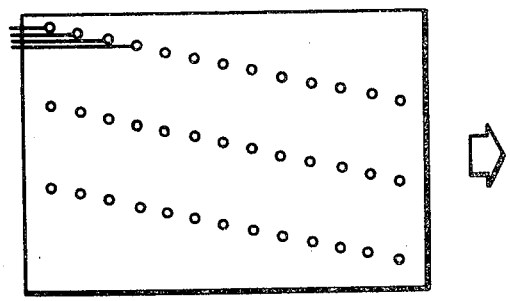
FIG. 17 is a plan view, for explaining the recording element arrangement.
Figure 18:
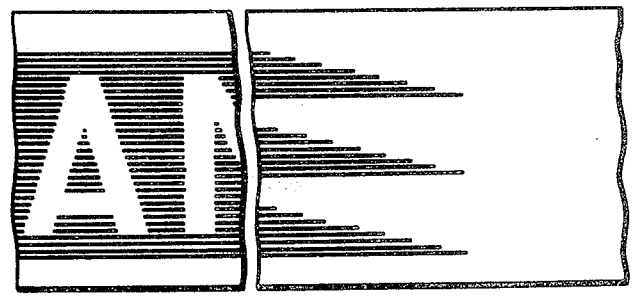
FIG. 18 is a diagram showing images obtained with the arrangement depicted in FIG. 17.

In the present invention, the picture is made in the form of an assembly of linear or continuous, dotted line picture elements as described in the foregoing, so that resolution of the picture is dependent upon the density of the recording elements 6 arranged. Where the diameters of the recording elements are very small, the recording elements may be aligned in a direction perpendicular to the travelling direction of the recording member 5 as depicted in FIG. 15 but, in order to obtain increased density, the recording elements 6 are aligned oblique to the travelling direction of the recording member 5 as shown in FIG. 16. Further, with the use of the drawing unit 4 employing a plurality of sets of recording elements aligned askew as depicted in FIG. 17, a picture can be obtained in such a manner as shown in FIG. 18.

In this invention, the control unit 2, which is employed in the case of using light as the primary signal, first converts a light signal of the optical image into an electric signal and, in some cases, further converts it into a magnetic or mechanical signal, thereby to control the recording of images by the recording elements 6. Therefore, the shorter the response time of each photo switching element 7 making up the control unit 2 becomes, the more the travelling speed of the recording member 5 and resolution of the picture can be increased. To this end, use is made of a photo switching element which is formed of photoconductive selenium, selenium doped with tellurium, cadmium selenide, lead sulfide, lead oxide, silicon, germanium or the like; but a photo switching element having a response time corresponding to the travelling speed of the recording member can similarly be employed.

The driving unit 10 (shown in FIGS. 11 and 12) in this invention is provided for disposing the recording member 5 to correctly face the drawing unit 4 and for driving it relative to the latter at a constant speed with the progress of recording. This may be achieved by fixing the drawing unit 4 and driving the recording member 5 or vice versa.

No particular restrictions are imposed on a coloring agent of the liquid imaging material 9 for use with the recording apparatus of this invention, so that when a cyan coloring agent is used, a picture in cyan is obtained and a magenta and a yellow coloring agent are used, pictures in magenta and yellow are obtained respectively.

Accordingly, a multi-color picture can be obtained by superimposing pictures on the recording member 5 based on color-separated originals or optical images or other signals.

As has been described in the foregoing, in the recording apparatus of this invention, any of a plurality of recording elements can be supplied with a liquid imaging material to record intermittent images on a recording member under the control of an original or an optical image or other input signal, so that the recording member need not be subjected to special treatments such as required for photosensitive, pressure-sensitive or like recording members and paper, cloth, a film of resin, a matal plate or other various materials can be used as they are.

Various liquids containing water and known inks can be used as the imaging material, so that danger of poison and fire can be avoided. Especially when the imaging material is composed mainly of water, it can be made noninflammable, innoxious and odorless. Further, since a coloring agent of high concentration can be employed, it is possible to dispense with drying and fixing processes.

Where the plurality of photo switching elements, which turn on and off in accordance with an optical image projected thereto, are connected with the corresponding recording elements of the drawing unit in a bit-by-bit manner, the recording elements draw images simultaneously with irradiation of the optical image, that is, exposure and drawing are achieved at the same time, so that copying or recording is completed by one process and there is substantially no influence of humidity as exerted in conventional electrostatic methods.

Further, since the control unit and the drawing unit are interconnected passing through the liquid imaging material storage and supply tank, the members for applying signals to the respective elements of the drawing unit and the member for supplying the imaging material to the elements can be disposed in the same space. This greatly reduces the size of the copying or recording apparatus and makes it very compact.

Moreover, where the recording elements are arranged so that the images formed thereby on the recording medium travelling relative to the recording elements may be divided into uniform intervals in the direction of travel of the recording member and where the photo switching elements of the control unit are arranged in a manner similar to that of the recording elements, an enlarged or reduced picture of an original can be obtained without using a lens system.

In the case of employing a recording element which comprises a very small nozzle supplied with the liquid imaging material, an electrode plate having a through hole coaxial with the nozzle and disposed adjacent to the tip of the nozzle and a ring of small diameter coaxial with the nozzle and disposed mounted on the nozzle in the vicinity of its tip or disposed between the tip of the nozzle and the electrode plate, and in which a convergent jet of the imaging material generated by applying a voltage between the nozzle and the electrode plate is made intermittent by applying a voltage to the ring, the drawing operation can be achieved noiselessly without making any contact with the recording member. Therefore, copying and printing on an uneven recording member such as cloth, pressed resin film or the like.

Further, in this case, the recording member is not disposed between the recording element and the electrode plate but on the opposite side from the recording member with respect to the electrode plate. This completely prevents the recording member from being stained by spattering of the liquid imaging material and permits the use of a conductive metal plate as the recording member and, in addition, prevents the recording member from adhering to the driving unit due to corona charges which are generated together with the jet of the imaging material. Further, where the recording apparatus of this invention is used for picture transmission, a plurality of recording elements simultaneously achieve recording, so that a picture can be transmitted at far higher speed than in the case of conventional apparatus employing a single recording element.

It will be apparent that many modifications and variations may be effected without departing from the scope of the novel concepts of this invention.

What is claimed is:

1. A recording apparatus comprising:
   a plurality of recording elements, each thereof comprising a hollow tubular nozzle having an outlet end for dispensing a liquid imaging material;
   means for supplying said liquid imaging material to said plurality of recording elements;
   a recording member disposed in close, opposing relationship to said recording elements adjacent said dispensing outlet ends thereof;
   means for advancing said recording member relative to said recording element;
   said plurality of recording elements being arranged relatively to one another and to said recording member so that images formed by said recording elements on the surface of said recording member are arranged in spaced, parallel relationship corresponding to the relative spacing of said recording elements in a direction transverse of said recording member; and
   electrically operated control means responsive to an image to be reproduced and operatively associated with said recording elements for selectively controlling the dispensing of said liquid imaging material from the outlet ends of each of said recording elements for application of said liquid material to said relatively advancing recording member in an assemblage of rows of intermittent linear marks arranged in said transversely spaced, parallel relationship corresponding to the arrangement of said recording elements relatively to one another, said control means including for each said recording element:
   an electrode plate having a through hole coaxial with the nozzle outlet end and disposed between said nozzle and said recording member;
   a ring disposed coaxially with said nozzle adjacent said nozzle outlet end;
   means for applying a voltage between said nozzle and said electrode plate to establish an electric field therebetween thereby to direct a convergent jet of said liquid imaging material through the through hole of said electrode plate and onto said advancing recording member; and
   means for applying intermittently a voltage to said ring in response to said image to be reproduced of the same polarity as said voltage applied between said nozzle and said electrode plate for reducing the said electric field established thereby and stopping the jet, thereby to form a reproduction of said image on said recording member.

2. A recording apparatus as recited in claim 1 wherein said intermittent voltage applying means of said control means includes a voltage source, a plurality of photoconductive switching elements respectively corresponding to said plurality of recording elements and responsive to said image to be reproduced, and a plurality of electrical resistance elements, each of said photoconductive switching elements being connected in a series circuit with a corresponding electrical resistance element, with the series connection thereof further being connected to said ring of a respectively corresponding said recording element, one terminal of each said series circuit of a photoconductive switching element and a resistive element being connected to said voltage source, and the other terminal of said series circuit being connected to a reference potential.

3. A recording apparatus as recited in claim 2 wherein said reference potential is ground potential of the apparatus.

4. A recording apparatus as recited in claim 3 wherein the terminal of each said series circuit connected to said resistance element is connected to ground potential, and the other terminal of said series circuit connected to said photoconductive switching element is connected to said voltage source.

5. A recording apparatus as recited in claim 3 wherein the terminal of each said series circuit connected to said resistance element is connected to said voltage source, and the other terminal of said series circuit connected to said photoconductive switching element is connected to ground potential.

6. A recording apparatus as recited in claim 6 wherein said control means further includes a plurality of photoconductive switching elements responsive to the image to be reproduced and disposed in a predetermined relationship relative to that of said recording elements, the spacing of said photoconductive switching elements differing from the spacing of said respectively corresponding recording elements thereby to produce a corresponding magnification of reduction in scale of the image reproduced on said recording member relative to that of said image to which said photoconductive switching elements respond, and wherein
   said advancing means advances said recording member at a speed selectively predetermined relative to said magnification or reduction in scale defined by the differing spacings of said photoconductive switching elements and said recording elements.

7. A recording apparatus as recited in claim 6 wherein the spacing of said photoconductive switching elements is greater than the spacing of said recording elements and said advancing means advances said recording member at a selectively predetermined reduced speed in accordance with the degree of reduction of the reproduced image.

8. A recording apparatus as recited in claim 6 wherein said recording elements are spaced relatively greater than the spacing of said photoconductive switching elements and wherein said advancing means advances said recording member at a selectively predetermined increased speed in accordance with the degree of magnification of the reproduced image.

9. A recording apparatus as recited in claim 1 wherein said control means includes a plurality of photoconductive switching elements responsive to the image to be reproduced and wherein said photoconductive switching elements are arranged in a corresponding transverse, spaced relationship as said recording elements but in a respectively reversed relationship relative to that of said recording elements and wherein said advancing means advances said recording member in a direction opposite to the direction of travel of an image scanned by said photoconductive switching elements.

10. A recording apparatus as recited in claim 1 wherein said intermittent voltage applying means applies a voltage to said rings of a polarity relative to that of the voltage applied by said applying means between said nozzle and said electrode plate so as to provide a negative-positive voltage relationship between said image to be reproduced and said reproduced image.

11. A recording apparatus as recited in claim 1 wherein said recording elements are spaced such that a plane passing therethrough passes through said liquid imaging material supplying means, and wherein said control means further includes a plurality of connectors respectively corresponding to said recording elements and each said connector extends through said imaging material supplying means for connection to said intermittent voltage applying means.

12. A recording apparatus as recited in claim 11 wherein said recording elements are disposed in a common plane extending through said imaging material supplying means.

13. A recording apparatus as recited in claim 1 wherein said recording elements are arranged obliquely and transversely to the relative direction of advancing of said recording member.

14. A recording apparatus as recited in claim 1 wherein there is provided a plurality of rows of said plural recording elements, each said row being spaced in parallel relationship with other said rows and with said parallel rows extending obliquely of the direction of advancing of said recording member relative to said recording elements.

15. A recording apparatus as recited in claim 1 wherein each recording element has a cover for shielding at least one of the nozzle and the ring of each of the plurality of recording elements from the nozzle and the ring of the other recording elements.

* * * * *

UNITED STATES PATENT OFFICE
CERTIFICATE OF CORRECTION

Patent No. 3,911,448    Dated October 7, 1975

Inventor(s) Genji Ohno, Tadamitsu Uchiyama, et al

It is certified that error appears in the above-identified patent and that said Letters Patent are hereby corrected as shown below:

Column 9, line 62, "matel" should be --metal--.
Column 12, line 16, "6" should be --1--.

Signed and Sealed this sixth Day of January 1976

[SEAL]

Attest:

RUTH C. MASON
Attesting Officer

C. MARSHALL DANN
Commissioner of Patents and Trademarks